(12) United States Patent
Manabe et al.

(10) Patent No.: US 6,477,333 B1
(45) Date of Patent: Nov. 5, 2002

(54) IMAGE FRAME CHANGING APPARATUS FOR CAMERA

(75) Inventors: Mitsuo Manabe; Mitsuhiko Oka, both of Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/672,975

(22) Filed: Sep. 29, 2000

(30) Foreign Application Priority Data

Sep. 29, 1999 (JP) .......................................... 11-276719

(51) Int. Cl.⁷ .......................... G03B 13/10; G03B 17/00

(52) U.S. Cl. ...................................... 396/380; 396/436

(58) Field of Search ................................ 396/378, 380, 396/435, 436

(56) References Cited

U.S. PATENT DOCUMENTS 5,583,593 A * 12/1996 Terada ........................ 396/435
5,732,298 A *  3/1998 Nishizawa et al. ......... 396/380

FOREIGN PATENT DOCUMENTS

JP            8160498         12/1994

* cited by examiner

Primary Examiner—David M. Gray
Assistant Examiner—Rochelle Blackman
(74) Attorney, Agent, or Firm—Birch, Stewart, Kolasch & Birch, LLP

(57) ABSTRACT

A view frame changing apparatus of the present invention is constructed in which cam grooves formed at view frame pieces are arched by the predetermined curvature; thus the cam pins can smoothly slide over the entire area of the sliding area of the cam grooves without being caught in the cam grooves. Moreover, the cam grooves are formed in areas of acute angles in between the two diagonal lines of the image frame; therefore, the frame changing apparatus can be compact in size.

6 Claims, 9 Drawing Sheets

HI-VISION SIZE

CONVENTION SIZE

F I G. 9
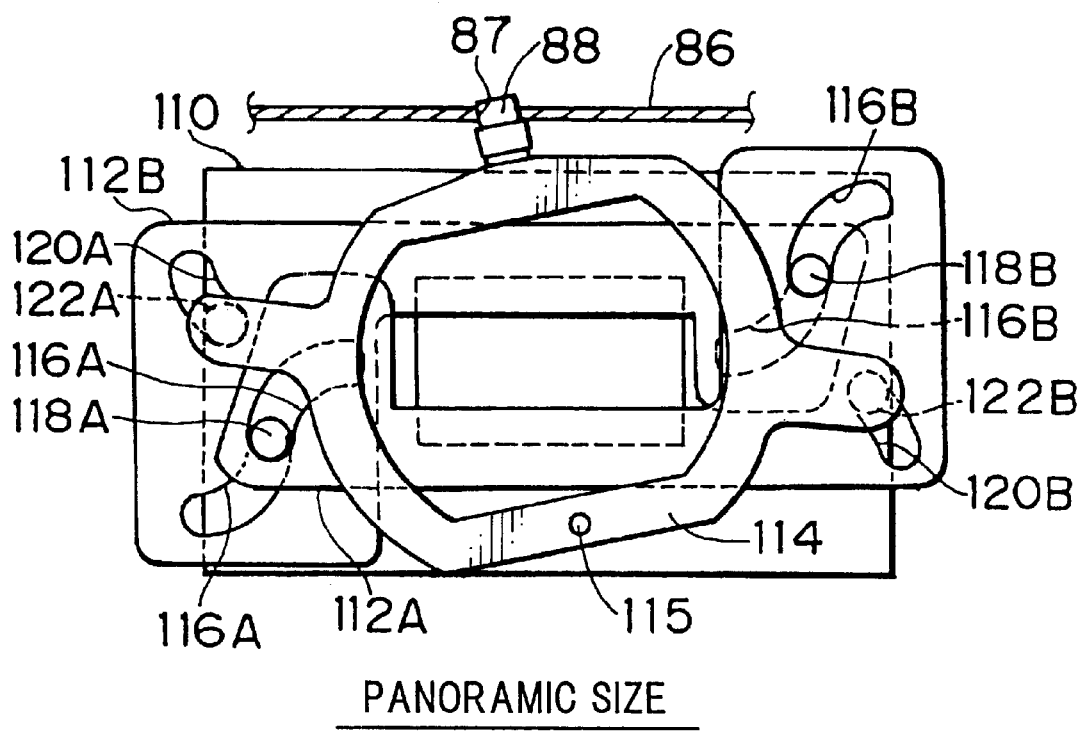
PANORAMIC SIZE

H-SIZED VIEW FRAME

IMAGE FRAME CHANGING APPARATUS FOR CAMERA

BACKGROUND OF THE INVENTION

1. Field of the Invention

The present invention relates to an image frame changing apparatus which can change a finder view frame or a photographing frame of a camera in frames with plural aspect ratios such as a high-vision size, a convention size, and a panoramic size.

2. Description of Background Art

A camera which can change a photographing size is provided with a view frame changing apparatus in an optical path of a finder optical system of the camera. The view frame changing apparatus can change a size of the view frame in a size corresponding with a size of the photographing frame.

A conventional view frame changing apparatus in FIG. 10 is a changing apparatus which can change the view frame in a high-vision size, a conventional size, and a panoramic size, and is constructed of a rectangular high-vision view frame 1, a pair of L-shaped convention/panoramic view frames 2A and 2B, and a drive ring 3.

A pair of cam pins 4A and 4B are projected at the high-vision view frame 1, and L-shaped cam grooves 5A and 5B which are formed at the convention/panoramic view frame 2A and 2B, are slidably overlapped and engaged with the pair of cam pins 4A and 4B. A pair of guide pins 6A and 6B are projected at the drive ring 3. The guide pin 6A is slidably engaged with a long hole 7A of the convention/panoramic view frame 2A, whereas the guide pin 6B is slidably engaged with a long hole 7B of the convention/panoramic view frame 2B.

By the above-described structure, the convention/panoramic view frames 2A and 2B are pushed by the guide pins 6A and 6B when the drive ring 3 rotates with a rotation axis 8 as the center, whereby the convention/panoramic view frames 2A and 2B are moved in opposite directions to each other on a plane which is parallel with the high-vision frame 1 while being guided by the cam pins 4A and 4B and the cam grooves 5A and 5B.

Thus, when rotating the drive ring 3 in a state in FIG. 10 (a high-vision state) in a counterclockwise direction with the rotation axis 8 as the center, the convention/panoramic view frames 2A and 2B are moved closer to each other in horizontal directions, so the view frame is changed to the view frame in the convention size. Moreover, when rotating the drive ring 3 in a clockwise direction from the state in FIG. 10 with the rotation axis 8 as the center, the convention/panoramic view frames 2A and 2B are moved closer to each other in vertical directions, so the view frame is changed in the panoramic size.

Japanese Patent Application Laid-open No. 8-160498 discloses an image frame changing apparatus which can change an image frame of optical equipment such as a finder view frame for a camera. The image frame changing apparatus uses a mechanism in which a pair of L-shaped image frame regulating members are moved by an arched cam groove.

However, the image frame changing apparatus disclosed in Japanese Patent Application Laid-open No. 8-160498 has a large image frame regulating members and the entire apparatus itself is thus large, because the arched cam grooves are formed in areas of obtuse angles in between two diagonal lines.

Moreover, because the cam grooves 5A and 5B of the convention/panoramic view frames 2A and 2B of the conventional view frame changing apparatus in FIG. 10 are formed in an L-shaped pattern by bending the cam grooves at 90 degrees, when sliding the cam pins 4A and 4B on the cam grooves 5A and 5B, the cam pins 4A and 4B are caught at a corner of the cam grooves 5A and 5B, and hence the convention/panoramic view frames 2A and 2B do not move smoothly.

The cam grooves 5A and 5B are the same as the arched cam groove of Japanese Patent Application No. 8-160498 in that the majority of the cam grooves are formed in areas of the two diagonal lines A and B in between the obtuse angle β of the image frame. Thus the convention/panoramic view frames 2A and 2B are large and the entire image view changing apparatus is large.

SUMMARY OF THE INVENTION

The present invention has been developed in view of the above-described circumstances, and has as its object the provision of the image frame changing apparatus which is compact in size by positioning the cam groove of the cam guiding device which constructs the image frame changing apparatus for the camera at a better position.

In order to achieve the above-described objects, the present invention provides the image frame changing apparatus for a camera in which a pair of L-shaped image frame changing members are arranged to face each other in a direction of a diagonal line of a rectangular image frame, and the image frame changing members are guided by a cam guiding device with a cam pin and cam grooves while moving the image frame changing members in opposite directions to each other on a plane that is parallel with said image frame, whereby changing sizes of the image frame in plural sizes, the image frame changing apparatus characterized in that: the cam grooves of the cam guiding device are in areas of acute angles in between the two diagonal lines of the image frame.

According to the present invention, the cam grooves are formed in the areas in between the two diagonal lines forming acute angles. As a result, the image frame changing members can be small in size, which thus makes the frame changing apparatus compact in size.

Since the cam grooves of the present invention are arched by a predetermined curvature, the cam pins slide smoothly in the entire area of the cam grooves without being caught in the cam grooves. The curvature for the cam grooves is preferable to be small, which means it should be almost straight.

Further, the image frame changing apparatus for the camera of the present invention can be used for a changing unit for changing a finder view frame or a photographing frame of a camera in frames with plural aspect ratios. By use of the image frame changing apparatus of the present invention, an arrangement of the image frame changing apparatus can be kept small; therefore a finder optical unit and a photographing optical unit can be compact in size.

BRIEF DESCRIPTION OF THE DRAWINGS

The nature of this invention, as well as other objects and advantages thereof, will be explained in the following with reference to the accompanying drawings, in which like reference characters designate the same or similar parts throught the figures and wherein:

FIG. 9 is an explanatory view of a case in which a panoramic view frame is formed.

DETAILED DESCRIPTION OF THE PREFERRED EMBODIMENT

Hereunder a preferred embodiment of an image frame changing apparatus for a camera of the present invention will be described according to the accompanying drawings.

Figure 1:
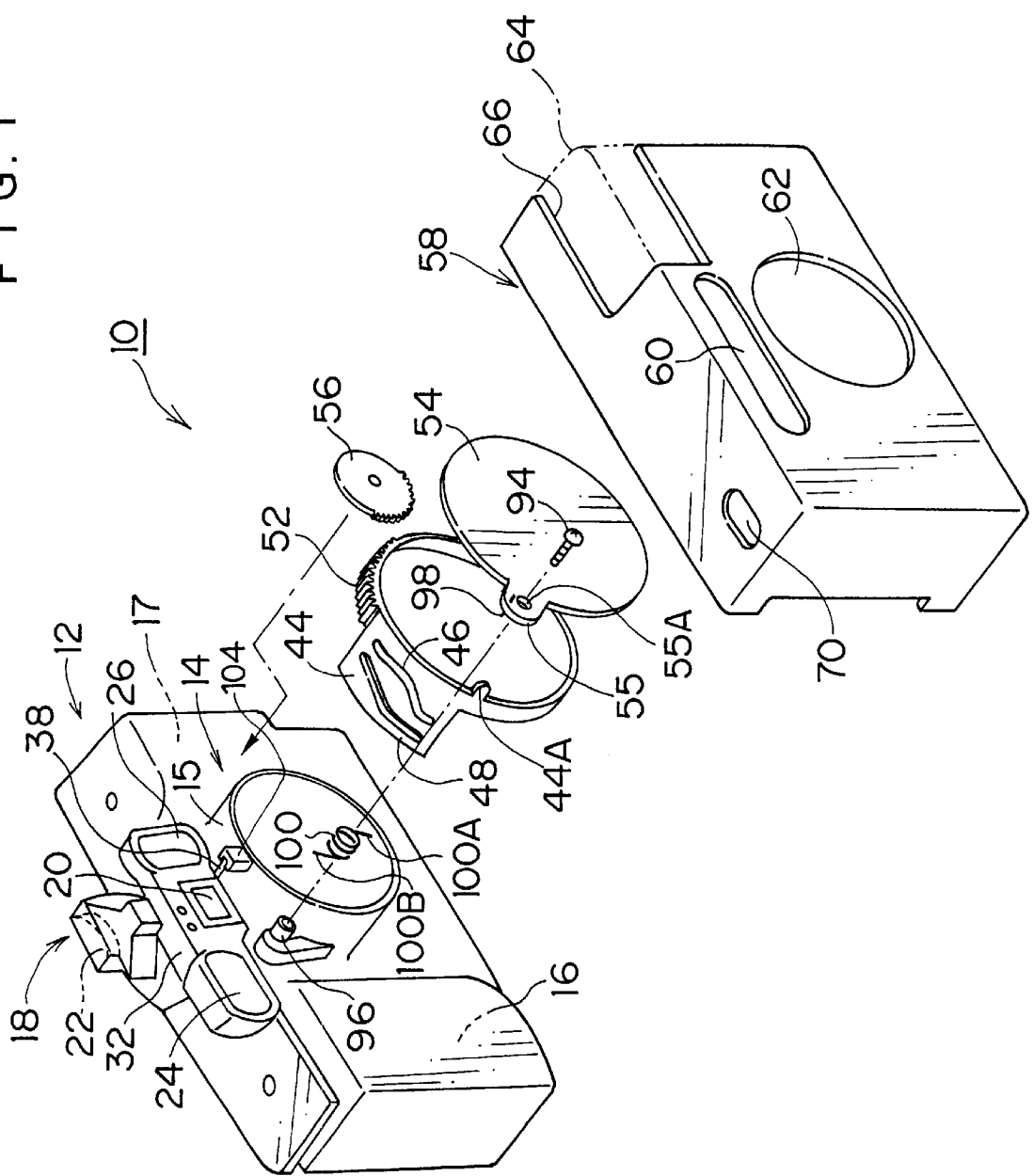
FIG. 1 is a perspective view of an assembly of a camera to which an image changing apparatus of the present invention is applied.

FIG. 1 is a perspective view of an assembly of a camera 10 to which an image frame changing apparatus of the present invention is applied.

A body 12 of the camera 10 is a shape of a rectangular parallelepiped, and is provided with a fixed cylinder 14 for holding a zoom lens barrel (not shown). The fixed cylinder 14 may be formed integrally with the body 12, or may be formed separately so as to incorporate into the body 12 when assembling. A container 16 of the film cartridge is formed at the upper left side of the fixed cylinder 14, and a film wind-up chamber 17 is formed at the upper right side of the fixed cylinder 14.

A housing 18 of the finder optical unit is attached at the upper portion of the fixed cylinder 14. An objective lens 20 of the finder optical system is fixed at an opening which is formed at the substantially center of the front face of the housing 18, whereas an eyepiece 22 is fixed at an opening which is formed at the rear portion and at the same time the back side of the housing 18. Moreover, AF (Auto-focus) measurement openings 24 and 26 are formed at the housing 18 so as to face each other between the objective lens 20, and a lens 25 of the AF light-receiving part is attached to the AF measurement opening 24 while a lens 27 of the AF illumination part is attached to the AF measurement opening 26. An AF measurement part for measuring a distance to a subject is constructed by the AF illumination part and the AF light-receiving part. The distance to the subject is obtained by the AF measurement part in accordance with the principle, of triangulation, and its result is applied to the auto-focus control.

Two groups of movable lenses 28 and 30 which comprise a front group and a rear group constructing the finder optical system, a prism 80, a view frame changing unit (image frame changing unit) 82, and a reflective mirror 84, are arranged in an order from the front to the rear of the finder optical axis between the objective lens 20 and the eyepiece 22. These optical members 28, 30, 80, 82, and 84 are contained and arranged at predetermined locations in a finder optical system container which is formed between the housing 18 and a lid 32.

In the finder optical system, a light which has entered from the objective lens 20 is collected at the movable lenses 28 and 30 and enters into the prism 80. The light is then reflected a number of times at the prism 80 in a predetermined direction, and then the subject image is formed on the view frame of the view frame changing unit 82. The subject image is reflected at the reflective mirror 84 so as to be changed to an erecting image, then is viewed through the eyepiece 22. A reference number 85 is referred to as a plate member for fixing the reflective mirror 84 at the housing 18. Another reference number 86 is referred to as a view frame changing lever. A drive pin 88 of the view frame changing unit 82 is fitted into a diagonal groove 87 which is formed on the surface of the lever 86. When the lever 86 is moved straight in a direction of the arrow in FIG. 2 by a CHP (Convention, High-vision, Panoramic) switch 89, the drive pin 88 moves back and forth along the diagonal groove 87, and the view frame changing unit 82 is driven whereby the view frame are changed among convention, high-vision, or panoramic sizes. The detailed description on the view frame changing unit 82 will be given later.

The movable lenses 28 and 30 are held at the lens holding frames 34 and 36, respectively. The lens holding frames 34 and 36 are attached to the housing 18 while being supported to move back and forth at a guide bar 38 which is disposed in parallel with the finder optical axis. The guide bar 38 is inserted through the housing 18, and its top end 38A is supported at a concave support part 104 which is formed at the fixed cylinder 14, whereas its rear end 38B is supported at a concave support part 106 which is formed at the rear of the body 12 of the camera. At the left side part of the lens holding frames 34 and 36 in FIG. 2, guide pins 35 and 37 are horizontally projected, and these guide pins 35 and 37 are slidably fitted in a straight groove 91 which is formed on a cam plate 90 that is mounted on the housing 18.

At the right side part of the object lens holding frame 34, a cam pin 40 is projected in a downwardly slanted direction, and also a cam pin 42 is projected in a downwardly slanted direction at the objective lens holding frame 36 of the rear lens group. The cam pins 40 and 42 are fitted in grooves 46 and 48 of the finder cam 44 which is rotatably fitted at the fixed cylinder 14. The finder cam 44 comprises a cam plate body 50 in a shape of an arched plate on which the cam grooves 46 and 48 are formed, and a ring-like gear 52 which is integrally formed with the cam plate body 50. The lens holding frames 34 and 36 are pressed in a direction to move closer to each other by the pressing force of a spring 92 which is hung between hooks 34A and 36A, and the cam pins 40 and 42 are tightly fit in the cam grooves 46 and 48 by this pressing force.

Figure 3:
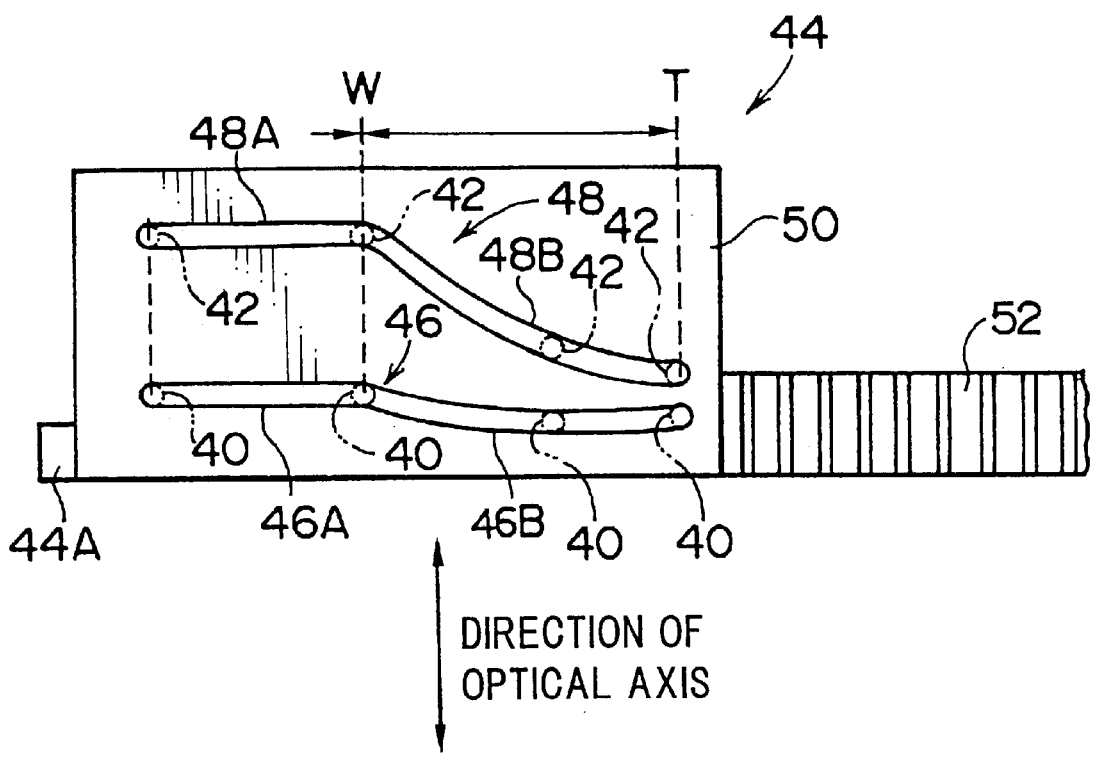
FIG. 3 is an expanded view of a finder cam provided to the camera in FIG. 1.

As seen from FIG. 3, the grooves 46 and 48 of the cam plate body 50 are formed of straight grooves 46A and 48A and curved grooves 46B and 48B. The straight grooves 46A and 48A are used when opening and closing an inner barrier (refer to FIGS. 4 and 5) for protecting the taking lens, and are formed in parallel with the direction in order to perpendicularly cross the direction of the optical axis in FIG. 3. Thus the cam pins 40 and 42 do not move back and forth in the direction of the optical axis while they are through the straight grooves 46A and 48A; in other words, the lens holding frames 34 and 36 of the front and the rear lens groups do not move in the direction of the optical axis while opening and closing the inner barrier 54.

The cam grooves 46B and 48B are provided in order to move the objective lens holding frames 34 and 36 in a direction of the optical axis so that the subject image in the magnification corresponding with the photographing magnification can be viewed from the eyepiece 22. The lens holding frames 34 and 36 of the front and the rear lens groups thus move along the cam grooves 46B and 48B while the cam pins 40 and 42 are through the cam grooves 46B and 48B. Thereby, the subject image at the magnification corresponding with the photographing magnification can be viewed from the eyepiece 22.

Figure 4:
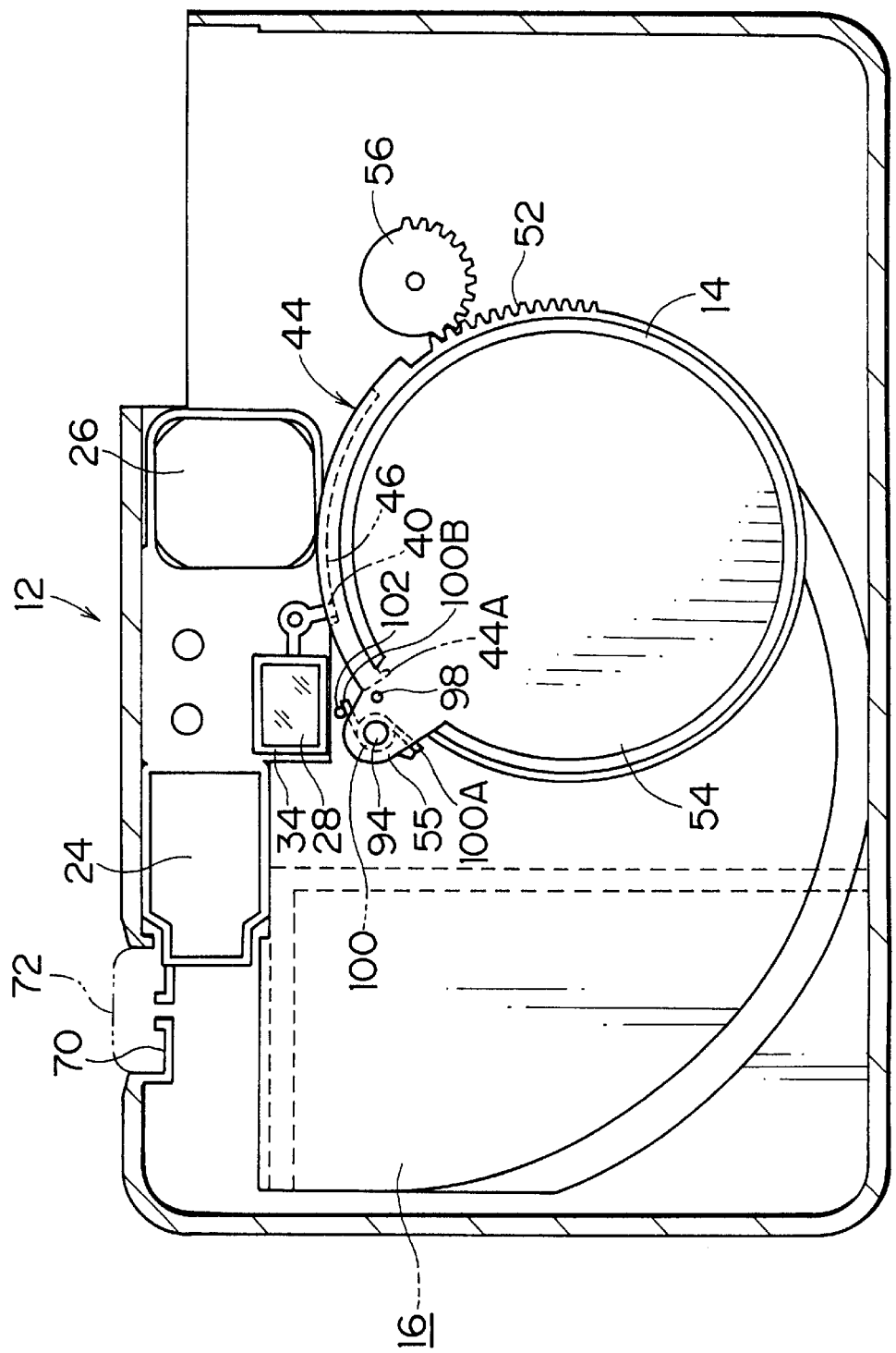
FIG. 4 is a front view of the camera in a state where an inner barrier is closed.
Figure 5:
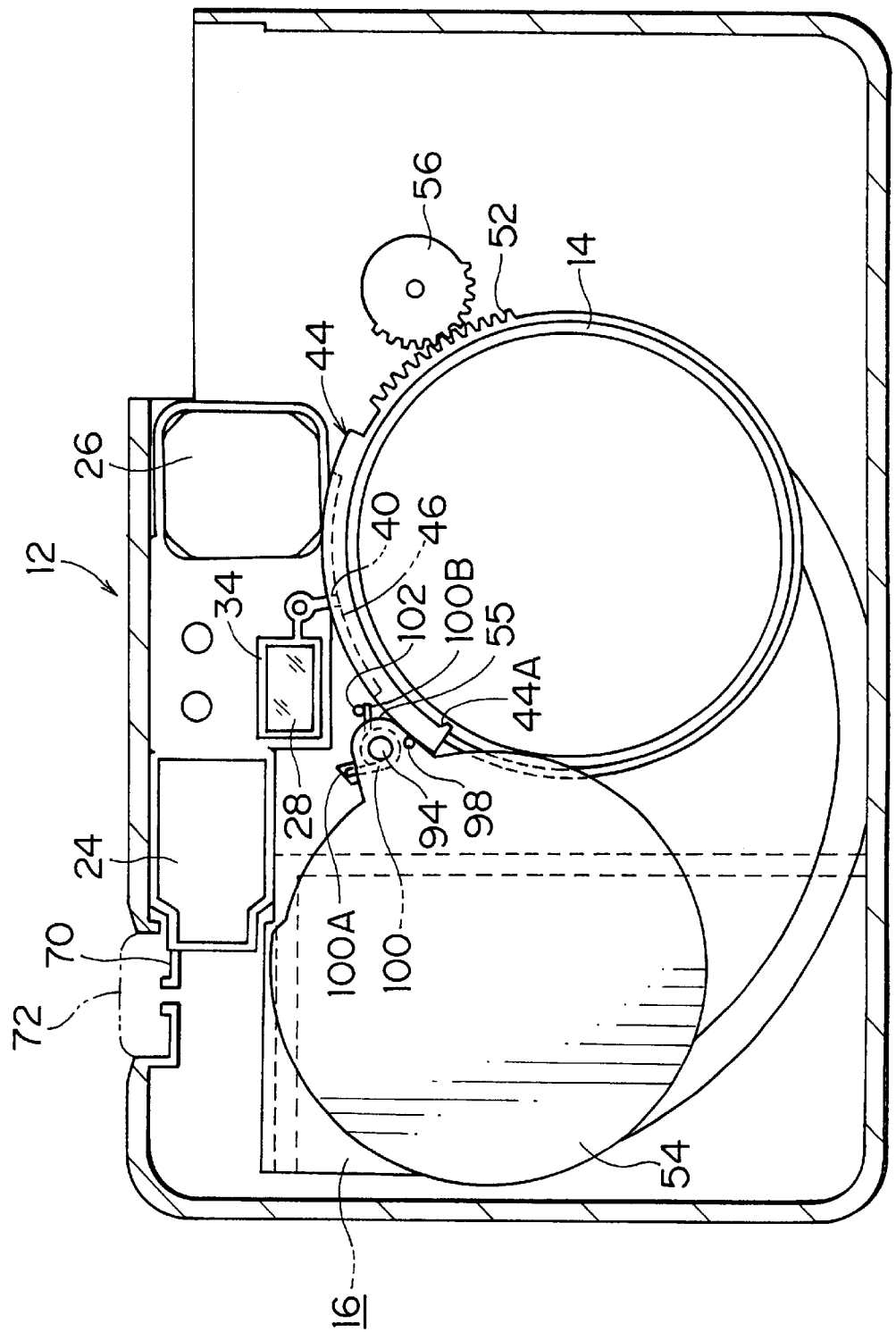
FIG. 5 is a front view of the camera in a state where the inner barrier is opened.

A gear 52 of the finder cam 44 is geared with a drive gear 56 which is attached to the body 12 of the camera as shown in FIGS. 4 and 5. The drive gear 56 is connected with a motor (not shown) via a deceleration mechanism. When driving the gear 56 forward/backward by driving the motor, the rotation force of the drive gear 56 is transmitted to the finder cam 44, and the finder cam 44 rotates in a clockwise/counterclockwise direction along the outer periphery of the fixed cylinder 14. By this mechanism, the inner barrier 54 is opened or closed, and the objective lens holding frames 34 and 36 of the front and the rear lens groups move in the direction of the optical axis along the cam grooves 46B and 48B, and zoom is performed.

A front cover 58 is put over the front face of the body 12 of the camera which is constructed as described above. The front cover 58 has an opening 62 to face at the fixed cylinder 14, and an opening 62 to face at the objective lens 20 and the AF measurement openings 24 and 26. The opening 62 which faces at the fixed cylinder 14 is closed by the inner barrier 54 when not used. A notch 66 (shown by an alternate long and two dotted line) for accepting a pop-up type strobe case 64 is formed at the upper right corner of the cover 58 in FIG. 1. A reference number 70 in FIG. 1 is referred to as an opening for arranging a shutter release switch 72 which is shown by the alternate long and two dotted line in FIGS. 4 and 5.

The drive mechanism of the inner barrier 54 is constructed of the finder cam 44, the drive gear 56, and the motor (not shown) which drives the drive gear 56. In other words, the drive mechanism of the inner barrier 54 is used in combination with the drive mechanism of the objective lens holding frames 34 and 36 of the finder optical system.

The inner barrier 54 is formed like a disk in such a manner as to cover the front face of the fixed cylinder 14 while closing the opening 62 of the front cover 58. A projecting piece 55 is formed at the periphery of the inner barrier 54, and a pin 94 is mounted at the opening 55A of the projecting piece 55 as shown in FIG. 1. The pin 94 is fitted into a bearing 96 which is projected from the body 12 of the camera. The inner barrier 54 is rotated back and forth in a range of the closing position in FIG. 4 to the opening position in FIG. 5 with the pin 94 as the rotation center.

As seen from FIG. 1, a pin 98 is projected at the projecting piece 55 of the inner barrier 54. A twisted coil spring 100 is inserted through the bearing 96, and one end 100A of the twisted coil spring 100 engages with a projecting piece 55 while the other end 100B engages with a pin 102 which is projected at the front face of the body 12 of the camera. When attaching the twisted coil spring 100 in this manner, the pressing force of the coil spring 100 is transmitted to the inner barrier 54 via the projecting piece 55. The inner barrier 54 is thereby held always at the body 12 in the state of being pressed in the closing direction.

In the closing state of the inner barrier 54 in FIG. 4, the pin 98 contacts with a bent piece 44A of the finder cam 44. When rotating the finder cam 44 in the counterclockwise direction in FIG. 4 in this state, the pin 98 is pressed by the bent piece 44A, and the inner barrier 54 rotates in the clockwise direction with the pin 94 as the fulcrum, then the inner barrier 54 is positioned at an opening position in FIG. 5 when rotating by a predetermined angle after the pin 98 overrides the bent piece 44A. The opening 62 of the front cover 58 in FIG. 1 is thereby completely opened, and the camera 10 is in the photographing state.

Figure 2:
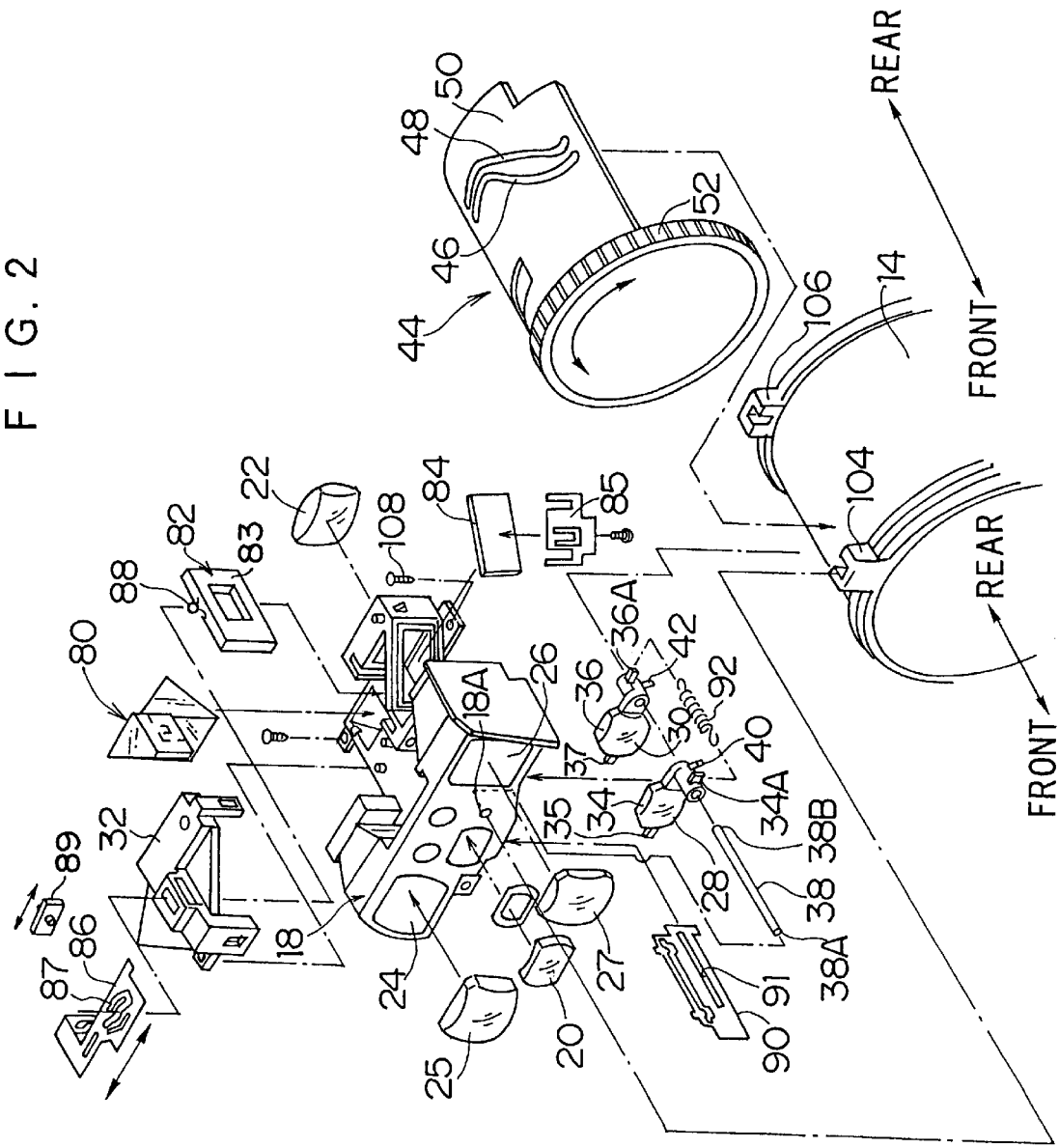
FIG. 2 is a perspective view of an assembly of a finder unit for the camera in FIG. 1.
Figure 6:
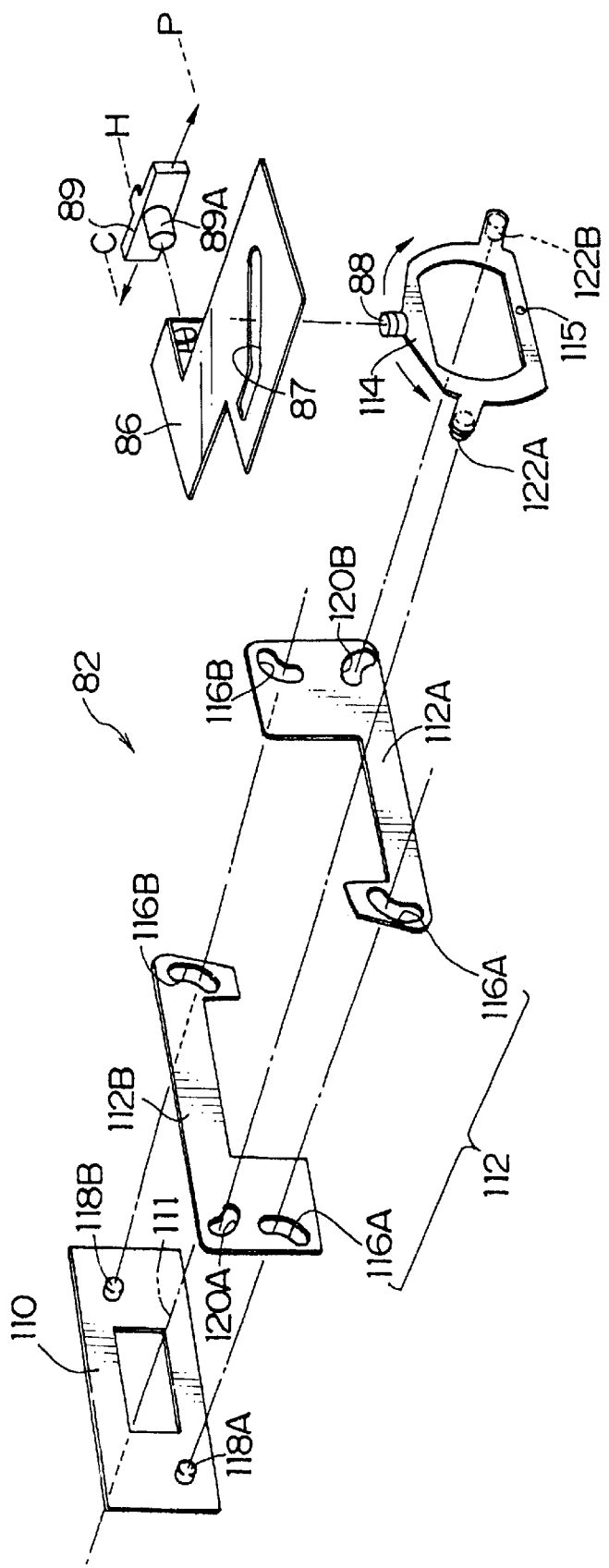
FIG. 6 is a perspective view of an assembly of a view frame changing apparatus in an embodiment of the present invention.

FIG. 6 is a perspective view of the view frame changing unit 82 which comprises a high-vision (H) view frame 110, a convention/panoramic (CP) view frame 112, a drive ring 114, and so forth, and the members 110, 112, and 114 are contained and arranged in a unit body case 83 in FIG. 2.

The H view frame 110 in FIG. 6 is a rectangular fixed frame which forms a view at a view angle corresponding with a high-vision (H) size of a print aspect ratio, and the H view frame 110 is the frame with the largest area including a convention (C) size or a panoramic (P) size.

At the rear side of the H view frame 110 in a finder optical axis 111, a CP view frame 112 is provided which can change a view at the view angle corresponding with the size C or size P. The CP view frame 112 is constructed of a pair of L-shaped view frame pieces (image frame changing members) 112A and 112B, and the pair of the view frame pieces 112A and 112B are combined by vertically facing each other in a direction of the diagonal line of the H view frame 110. The H view frame 110 is changed to the C-sized view frame or the P-sized view frame by moving the pair of view frame pieces 112A and 112B in a direction to be closer to each other at 45 degrees, or moving the view frame pieces 112A and 112B in a direction to be farther from each other at 45 degrees.

Figure 7:
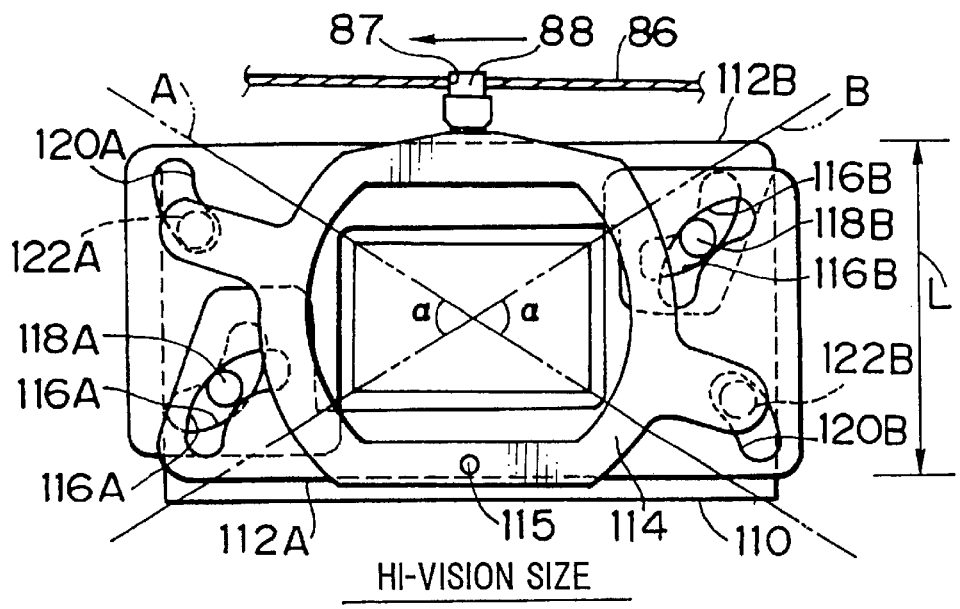
FIG. 7 is an explanatory view of a case in which a high-vision view frame is formed.
Figure 8:
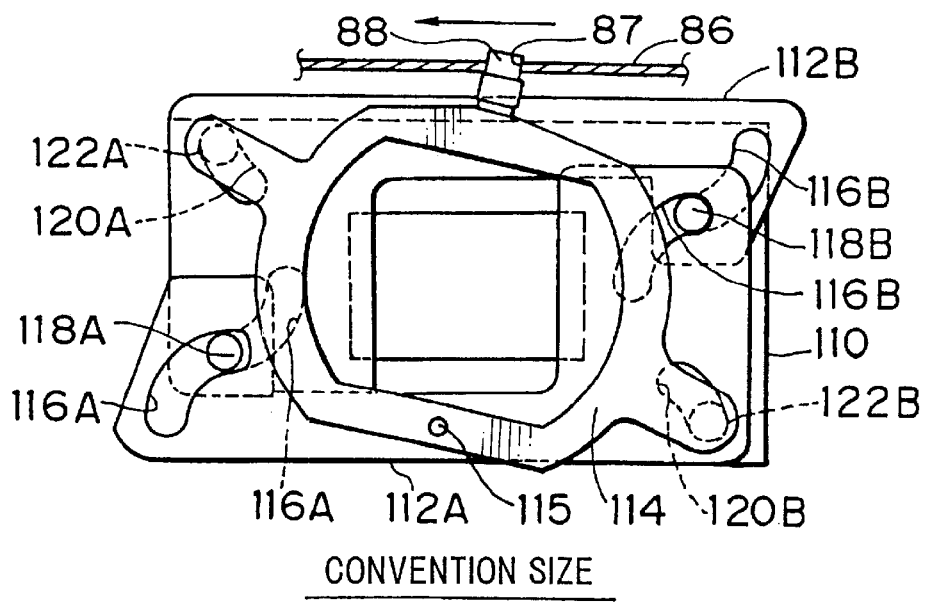
FIG. 8 is an explanatory view of a case in which a convention view frame is formed.

When moving the view frame pieces 112A and 112B are moved in the direction to be closer to each other at 45 degrees from the position of the high-vision size in FIG. 7, the right and left sides of the CP view frame 112 are moved closer to each other, while the top and bottom sides of the CP view frame 112 are moved farther from each other, whereby a convention-sized view frame in FIG. 8 is formed in which the right and left sides of the high-vision are partially regulated. Moreover, when moving the view frame pieces 112A and 112B in the direction to be farther from each other at 45 degrees from the position of the high-vision sized view frame in FIG. 7, the top and the bottom sides of the CP view frame 112 are moved closer to each other, thus a panoramic-sized view frame in FIG. 9 is formed in which the top and bottom sides of the high-visionsized view frame are partially regulated.

Viewing at both ends of the view frame pieces 112A and 112B, cam grooves 116A and 116B are respectively arched by a predetermined curvature at 45 degrees as shown in FIG. 6. The cam grooves 116A and 116A are engaged with a pin 118A which is projected at the H view frame 110, whereas the cam grooves 116B and 116B are engaged with a pin 118B which is projected from the H view frame 110.

Viewing the upper left corner of the view frame piece 112A in FIG. 6, an arched long hole 120A is formed there, and at the right bottom corner of the view frame piece 112B in FIG. 6, a long hole 120B in the same shape as the long hole 120A is formed. The long hole 120A is engaged with a pin 122A which is projected at the left side of a drive ring 114, whereas the long hole 120B is engaged with a pin 122B which is projected at the right side of the drive ring 114. A guide member (not shown) for guiding the rotation of the drive ring 114 is provided at the rear of the drive ring 114. The drive ring 114 is guided by the guide member and rotated with a rotation axis 115 as the center; hence, the view frame is changed by the view frame pieces 112A and 112B.

Now, an operation will be described of the view frame changing unit 82 which is constructed as presented above.

First, the CHP switch 89 which is connected with the view frame changing lever 86 via the pin 89A is moved from an H position to a P position in FIG. 6, and correspondingly the drive ring 114 which is connected with the diagonal groove 87 of the view frame changing lever 86 via the drive pin 88 is rotated at a predetermined angle in the clockwise direction in FIG. 6 with the rotation axis 115 as the center. The view frame pieces 112A and 112B move from the position of the high-vision-sized view frame in FIG. 7 to be closer to each other at 45 degrees. Then the right and left sides of the CP view frame 112 move closer to each other while the top and the bottom sides move farther from each other, whereby the convention-sized view frame in FIG. 8 is formed.

On the other hand, when moving the CHP switch 89 from the H position to the P position in FIG. 6, the drive pin 88 is pushed by the diagonal groove 87 and the drive ring 114 rotates at the predetermined angle in the counterclockwise direction with the rotation axis 115 as the center. The view frame pieces 112A and 112B move from the position of the high-vision-sized view frame in FIG. 7 in the direction of 45 degrees, and the top and bottom sides of the CP view frame 112 move closer to each other while the right and left sides move farther from each other, thereby forming the panoramic-sized view frame in FIG. 9. Presented hereabove is the operation of the view frame changing unit 82.

The cam grooves 116A and 116B of the view frame changing unit 82 in the present embodiment which are formed at the view frame pieces 112A and 112B are arched by the predetermined curvature. Thus, the cam pins 118A and 118B slide smoothly over the entire area of the cam grooves 116A and 116B without being caught in the cam grooves 116A and 116B, so the view frame pieces 112A and 112B can move smoothly.

In the view frame changing unit 82 in FIG. 7, the cam grooves 116A and 116B are formed in the areas of acute angles α which are formed by the two diagonal lines A and B of the respective view frames C, H, and P; therefore, the H view frame 110 as well as the entire view frame changing unit 82 can be compact in size.

Figure 10:
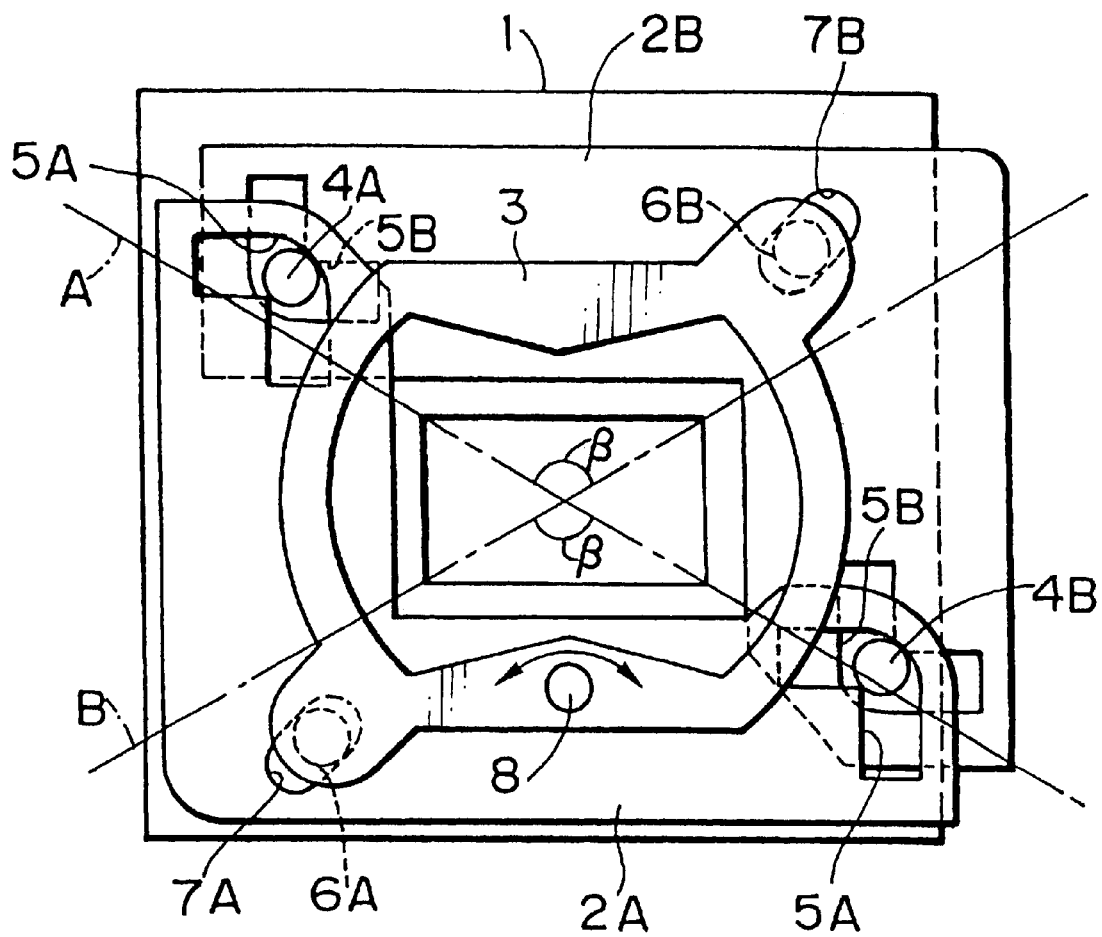
FIG. 10 is a view showing a structure of a conventional view frame changing apparatus of the background art.

Here, a size of the view frame changing unit 82 at the high-vision size in the present embodiment in FIG. 7 and a size of the view frame changing unit at a conventional high-vision size in FIG. 10 are compared. In order to compare the sizes of both view frame changing units, the high-vision view frames are drawn in the same size in the Figures. As apparent from FIGS. 7 and 10, the view frame changing unit 82 can be in a size which is just 60% of the conventional view frame changing unit.

In the present embodiment, the image frame changing apparatus is applied to the view frame changing unit 82 of the finder optical unit; however the present invention is not limited to such use. The image frame changing apparatus of the present invention can be applied also to a changing unit of the photographing optical unit with a similar structure which changes a photographing frame of the camera into frames with plural aspect ratios such as C-convention, H-high-vision, and P-panoramic. By applying the image frame changing unit of the present invention to the finder optical unit and the photographing optical unit in the manner as described above, the space for arranging the image frame changing apparatus can be conserved, and thus the finder optical unit as well as the photographing optical unit can be compact in size.

As described above, the cam grooves of the cam guiding device which construct the image frame changing apparatus of the present invention are formed in the areas of acute angles in between the two diagonal lines of the view frames; therefore, the image frame changing apparatus can be compact in size. Moreover, the cam grooves are arched by the predetermined curvature; thus the image frame changing member can be moved smoothly.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image frame changing apparatus for a camera comprising:

a pair of L-shaped image frame changing members are arranged to face each other in a direction of a pair of diagonal lines of a rectangular image frame, wherein said pair of diagonal lines form regions enclosed by a pair of obtuse angles and regions enclosed by a pair of acute angles, said obtuse and said acute angles being formed by an intersection of said diagonal lines, and a cam guiding device with cam pins and cam grooves, wherein the image frame changing members are guided by the cam guiding device with the cam pins and the cam grooves while moving the image frame changing members in opposite directions to each other on a plane that is parallel with said image frame when changing sizes of said image frame and said cam grooves of said cam guiding device are formed within the regions formed by said acute angles in between the two diagonal lines of said image frame and on said L-shaped image changing members, and each cam groove is arcuate with a predetermined curvature; and a drive ring, wherein a vertical movement and a horizontal movement of said L-shaped changing members adjusts an effective frame size of said image frame to a high vision view frame size, a conventional view frame size and a panoramic view frame size.

2. The image frame changing apparatus for the camera as defined in claim 1, wherein said image frame changing apparatus for the camera is a changing apparatus for changing at least one of a view frame of a view finder of the camera and a photographing frame of the camera in frames with plural aspect ratios.

3. The image frame changing apparatus according to claim 1, wherein said cam pins includes at least one pin projecting from said drive ring toward said L-shaped changing members and operatively engaging said cam grooves.

4. An image frame changing apparatus for a camera comprising:

a high vision (H) view frame;

a rectangular conventional/panoramic (CP) view frame provided on a rear side of said high vision view frame, said rectangular conventional/panoramic (CP) view frame including a pair of L-shaped image frame changing members arranged to face each other in a direction of a pair of diagonal lines of the rectangular conventional/panoramic view frame, wherein said pair of diagonal lines form regions enclosed by a pair of obtuse angles and regions enclosed by a pair of acute angles, said obtuse and said acute angles being formed by an intersection of said diagonal lines, and a cam guiding device with cam pins and cam grooves, wherein the image frame changing members are guided by the cam guiding device with the cam pins and the cam grooves while moving the image frame changing members in opposite directions to each other on a plane that is parallel with said image frame when changing sizes of said image frame and said cam grooves of said cam guiding device are formed within the regions formed by said acute angles in between the two diagonal lines of said image frame and on said L-shaped image changing members, and each cam groove is arcuate with a predetermined curvature; and a drive ring, wherein said conventional/panoramic (CP) view frame is positioned between said high vision (H) view frame and said drive ring, and a vertical movement and a horizontal movement of said L-shaped changing members adjusts an effective frame size of said high vision view frame.

5. The image frame changing apparatus according to claim 4, wherein said cam pins includes at least one pin projecting from said high vision view frame and at least one pin projecting from said drive ring toward said conventional/panoramic (CP) and operatively engaging said cam grooves.

6. The image frame changing apparatus according to claim 4, wherein said high vision view frame and said conventional/panoramic view frame permit an effective image size of a conventional size, a panoramic size and a high-vision size.

* * * * *